(12) United States Patent  
Matsunaga (10) Patent No.: US 6,980,258 B1  
(45) Date of Patent: Dec. 27, 2005

(54) METHOD AND CIRCUIT FOR EMPHASIZING CONTOUR

(75) Inventor: Seiji Matsunaga, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 443 days.

(21) Appl. No.: 10/089,799

(22) PCT Filed: Oct. 25, 2000

(86) PCT No.: PCT/JP00/07485

§ 371 (c)(1),  
(2), (4) Date: Apr. 2, 2002

(87) PCT Pub. No.: WO01/33834

PCT Pub. Date: May 10, 2001

(30) Foreign Application Priority Data

Oct. 30, 1999 (JP) .................. 11/346641

(51) Int. Cl.$^7$ ............................ H04N 5/21
(52) U.S. Cl. .................. 348/625; 348/625; 382/266
(58) Field of Search ............. 348/625, 627–631, 348/26, 252; 382/266, 267, 205, 272; 345/63

(56) References Cited

U.S. PATENT DOCUMENTS

| | | | | |
|---|---|---|---|---|
| 4,677,461 A | * | 6/1987 | Mizutani et al. | 348/630 |
| 4,706,113 A | * | 11/1987 | Ito et al. | 348/630 |
| 4,733,300 A | * | 3/1988 | Sugiyama et al. | 348/448 |
| 4,918,528 A | * | 4/1990 | Oohashi | 348/625 |
| 5,345,259 A | * | 9/1994 | Shibazaki | 348/26 |
| 5,543,859 A | * | 8/1996 | Miyata et al. | 348/625 |
| 5,561,473 A | * | 10/1996 | Saionji et al. | 348/628 |
| 5,646,691 A | * | 7/1997 | Yokoyama | 348/416.1 |
| 5,731,845 A | * | 3/1998 | Kashimura | 348/630 |
| 5,933,529 A | * | 8/1999 | Kim | 382/199 |
| 6,297,854 B1 | * | 10/2001 | Suzuki et al. | 348/625 |
| 6,414,657 B1 | * | 7/2002 | Kasahara et al. | 345/63 |
| 6,424,383 B1 | * | 7/2002 | Terai et al. | 348/628 |
| 6,476,876 B1 | * | 11/2002 | Matsunaga et al. | 348/625 |

FOREIGN PATENT DOCUMENTS

| | | |
|---|---|---|
| JP | 02-79566 | 3/1990 |
| JP | 08-289173 | 11/1996 |
| JP | 10-257352 | 9/1998 |

* cited by examiner

*Primary Examiner*—Paulos M. Natnael  
(74) *Attorney, Agent, or Firm*—Flynn, Thiel, Boutell & Tanis, P.C.

(57) ABSTRACT

More natural contour emphasizing processing is performed by detecting the direction of a contour with respect to a point where horizontal and vertical contours cross and a diagonal contour point. The times of an objective pixel and all the pixels adjacent to the objective pixel in the horizontal, vertical, diagonal directions are made to agree with one another, contour emphasis values weighted with respect to the brightness of the pixel that has the largest difference in brightness among the pixels adjacent in the directions and the brightness of the objective pixel are calculated and added to the objective pixel. In order to solve the problem in a diagonal contour point, if two weighted continuous contour emphasis values have the same signs, the before and after contour emphasis values are adopted, and otherwise, diagonal optimization that the before and after contour emphasis values are made zero is performed and they are added to the objective pixel. Thus, more natural contour emphasis is performed.

5 Claims, 6 Drawing Sheets

(a) Original State

| | | | | | |
|---|---|---|---|---|---|
| 8 | 8 | 8 | 8 | 8 | 8 |
| 8 | 8 | 8 | 8 | 8 | 8 |
| 8 | 8 | 8 | 4 | 4 | 4 |
| 8 | 8 | 4 | 4 | 4 | 4 |
| 8 | 8 | 4 | 4 | 4 | 4 |
| 8 | 8 | 4 | 4 | 4 | 4 |

(b) Horizontal Contour

| | | | | | |
|---|---|---|---|---|---|
| 0 | 0 | 0 | 0 | 0 | 0 |
| 0 | 0 | 0 | 0 | 0 | 0 |
| 0 | +1 | −1 | 0 | 0 | 0 |
| 0 | +1 | −1 | 0 | 0 | 0 |
| 0 | +1 | −1 | 0 | 0 | 0 |
| 0 | +1 | −1 | 0 | 0 | 0 |

(c) Vertical Contour

| | | | | | |
|---|---|---|---|---|---|
| 0 | 0 | 0 | 0 | 0 | 0 |
| 0 | 0 | +1 | +1 | +1 | +1 |
| 0 | 0 | −1 | −1 | −1 | −1 |
| 0 | 0 | 0 | 0 | 0 | 0 |
| 0 | 0 | 0 | 0 | 0 | 0 |
| 0 | 0 | 0 | 0 | 0 | 0 |

(d) Contour Emphasis

| | | | | | |
|---|---|---|---|---|---|
| 8 | 8 | 8 | 8 | 8 | 8 |
| 8 | ⑧ | 9 | 9 | 9 | 9 |
| 8 | 9 | ② | 3 | 3 | 3 |
| 8 | 9 | 3 | 4 | 4 | 4 |
| 8 | 9 | 3 | 4 | 4 | 4 |
| 8 | 9 | 3 | 4 | 4 | 4 |

Fig. 3 PRIOR ART

(a) Original State

| | | | | | |
|---|---|---|---|---|---|
| 8 | 8 | 8 | 8 | 8 | 4 |
| 8 | 8 | 8 | 8 | 4 | 4 |
| 8 | 8 | 8 | 4 | 4 | 4 |
| 8 | 8 | 4 | 4 | 4 | 4 |
| 8 | 4 | 4 | 4 | 4 | 4 |
| 4 | 4 | 4 | 4 | 4 | 4 |

(b) Contour Emphasis

| | | | | | |
|---|---|---|---|---|---|
| 8 | 8 | 8 | 8 | ⑩ | ② |
| 8 | 8 | 8 | ⑩ | ② | 4 |
| 8 | 8 | ⑩ | ② | 4 | 4 |
| 8 | ⑩ | ② | 4 | 4 | 4 |
| ⑩ | ② | 4 | 4 | 4 | 4 |
| ② | 4 | 4 | 4 | 4 | 4 |

METHOD AND CIRCUIT FOR EMPHASIZING CONTOUR

TECHNICAL FIELD OF THE INVENTION

The present invention relates to a contour emphasizing method and circuit designed so that in processing the digital video signals representing the contours, the directional factors of the contours are taken into consideration when emphasizing the contours.

BACKGROUND ART

Figure 1:
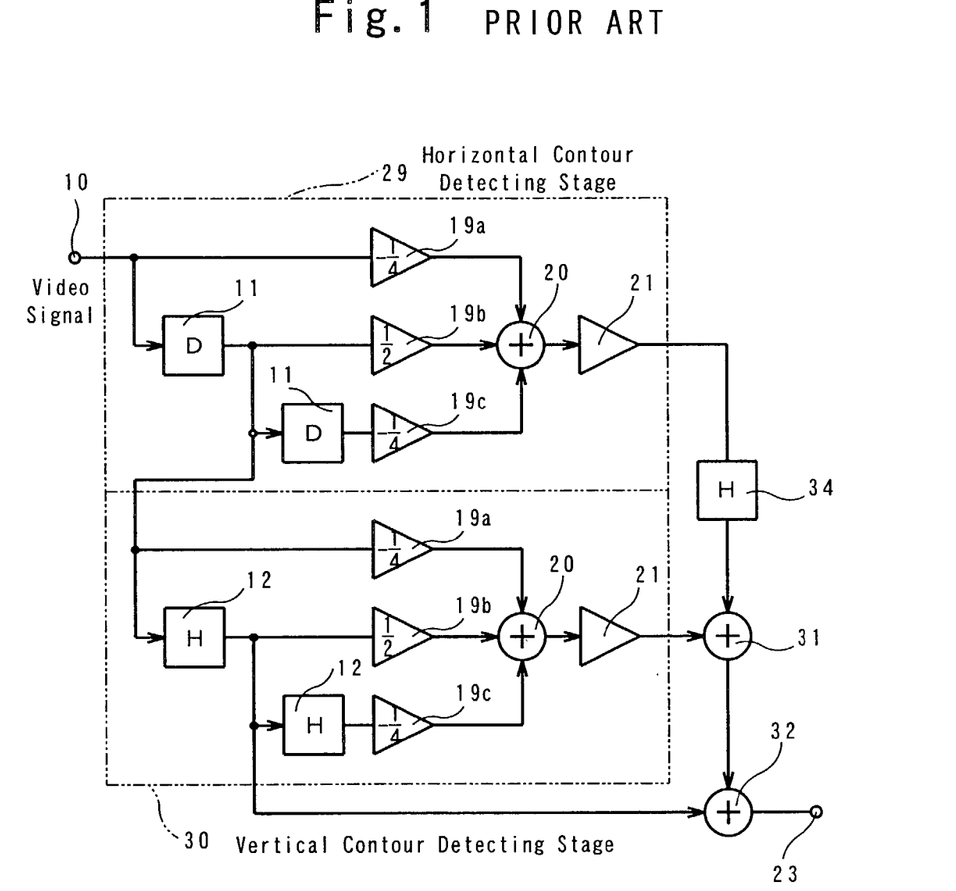
FIG. 1 is a block diagram showing a conventional contour emphasizing circuit.

As seen from FIG. 1, conventionally, this kind of contour emphasizing circuit comprises a horizontal contour detecting stage 29, a vertical contour detecting stage 30, an adding circuit 31 for giving the sum of the output of the horizontal contour detecting stage 29 and the output of the vertical contour detecting stage 30, and another adding circuit 32 for adding the contour component signal outputted from the adding circuit 31 to the video signal.

Said horizontal contour detecting stage 29 comprises a contour detecting filter 19a directly connected to a video signal input terminal 10, a contour detecting filter 19b connected to the same through 1 set of 1-dot delay circuit 11, a contour detecting filter 19c connected to the same through 2 sets of 1-dot delay circuit 11, an adding circuit 20 for giving the sum of the outputs from the contour detecting filters 19a, 19b and 19c, a coefficient multiplying circuit 21 for multiplying a predetermined coefficient K1, and a 1-line delay circuit 34 connected to the coefficient multiplying circuit 21. More particularly, the horizontal contour components are detected from the objective pixel and the pixel preceding by 1 dot and the pixel immediately following the objective pixel. The delay circuit 34 is provided for synchronizing the timing of the output of the vertical contour detecting stage 30 with it.

The vertical contour detecting stage 30 comprises the contour detecting filter 19a connected to the video signal input terminal 10 through 1 set of 1-dot delay circuit 11, the contour detecting filter 19b connected to the same through 1 set of 1-dot delay circuit and 1 set of 1-line delay circuit, the contour detecting filter 19c connected to the same through 1 set of 1-dot delay circuit 11 and 2 sets of 1-line delay circuit 12, the adding circuit 20 for outputting the sum of the outputs of the contour filters 19a, 19b and 19c, and the coefficient multiplying circuit for multiplying a predetermined coefficient K2. In other words, the vertical contour components are detected from the objective pixel and the pixel preceding the objective pixel by 1 dot and the pixel immediately following the objective pixel.

Now, let's assume that the digital video signals respectively representing the contours in the horizontal direction and the vertical direction are inputted to a conventional circuit as is described above.

Figure 2:
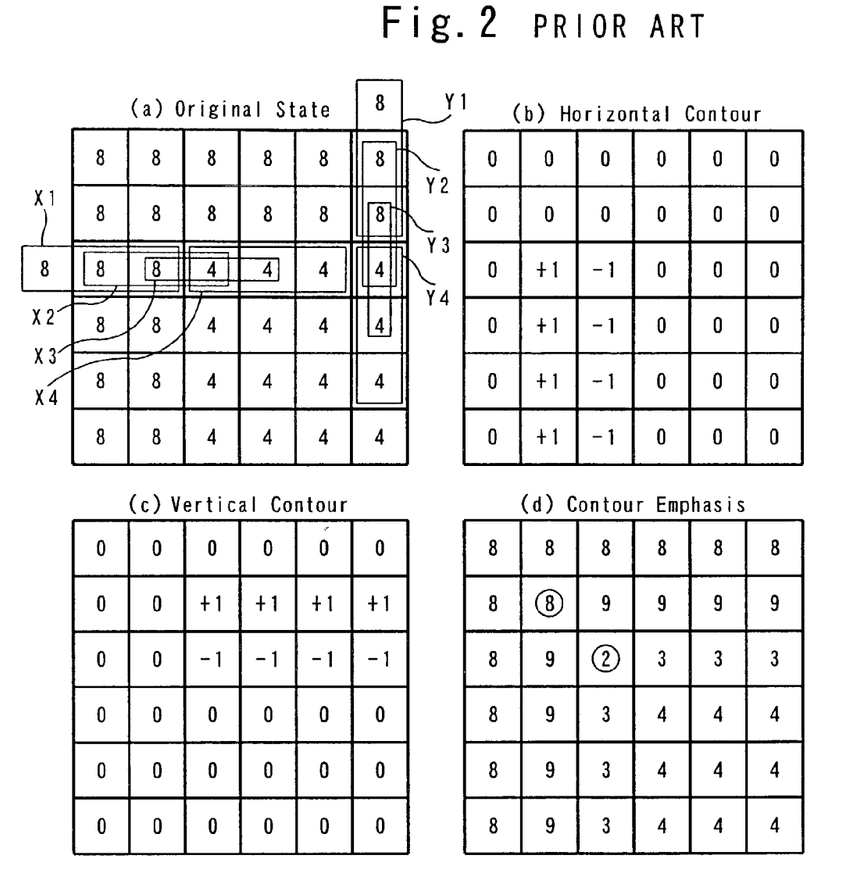
FIG. 2 is a diagram showing the signals representing the contours extending in horizontal direction and vertical direction, whose states varying according to different stages, inputted to the contour emphasizing circuit of FIG. 1, wherein (a) is a diagram showing the original states of the digital signals inputted from the video signal input terminal 10; (b), a diagram showing the signal outputted from the horizontal contour detecting stage 29; (c), a diagram showing the signal outputted from the vertical contour detecting stage 30; (d), a diagram showing the signal outputted from the video signal output terminal 23.

This case refers to one where the differences in luminance occur consecutively, and thus the differences in the luminance not occurring consecutively are not considered to be contours. In the example shown in FIG. 2(a), the portions where luminance [8] and luminance [4] occur consecutively are recognized as contours.

In such a case, in processing by the horizontal contour detecting stage 29, when the coefficients are given as $-\frac{1}{4}$, $\frac{2}{4}$ and $\frac{1}{4}$ respectively, the outputs of the contour detecting filters 19a, 19b and 19c become $8\times(-\frac{1}{4})$, $8\times(\frac{2}{4})$ and $8\times(-\frac{1}{4})=-2$, +4 and −2 respectively when the pixel at the third row and the first column in FIG. 2(a) is picked out as an objective pixel, and the output of the adding circuit 20 becomes 0. Similarly, when the pixel at the intersection of the third row and the second column is picked out as an objective pixel X2, they become $8\times(-\frac{1}{4})$, $8\times(\frac{2}{4})$ and $4\times(-\frac{1}{4})=-2$, +2 and −1 respectively, and the output of the adding circuit 20 becomes +1;

when the pixel at the intersection of the third row and the third column is picked out as an objective pixel X3, they become $8\times(-\frac{1}{4})$, $4\times(\frac{2}{4})$ and $4\times(-\frac{1}{4})=-2$, +2 and −1 respectively, and the output of the adding circuit 20 becomes −1;

when the pixel at the intersection of the third row and the fourth column is picked out as an objective pixel X4, they become $4\times(-\frac{1}{4})$, $4\times(\frac{2}{4})$ and $4\times(-\frac{1}{4})=-1$, +2 and −1 respectively, and the output of the adding circuit 20 becomes 0.

In the example shown in FIG. 2(a), only these four cases are available. When the coefficient in the coefficient multiplying circuit 21 is given as K1= 1, the output of said circuit is as shown in FIG. 2(b).

Since only 4 cases, namely, Y1, Y2, Y3 and Y4 are available even when processing by the vertical contour detecting stage 30, similarly to the cases described above, when the coefficient of the coefficient multiplying circuit 21 is given as K2=1, the output is as shown in FIG. 2(c).

When these values are added by the adding circuit 31 and then added to the original video signals by the adding circuit 32, the luminance of the contour having the luminance [8] becomes 8+1=9, while the luminance of the contour having the luminance [4] becomes 4−1=3, thereby emphasizing the contour at the video signal output terminal 23 as shown in FIG. 2(c).

Figure 3:
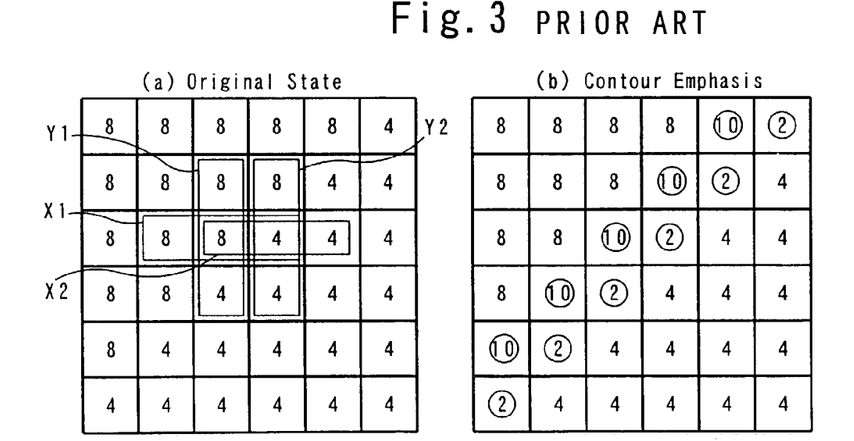
FIG. 3 is a diagram showing the signals representing the contours extending in a diagonal direction, whose states varying according to different stages, inputted to the contour emphasizing circuit of FIG. 1, wherein (a) is a diagram showing the original states of the digital signals inputted from the video signal input terminal 10; (b), a diagram showing the signals outputted from the video signal output terminal 23.

Next, let's assume a case where the digital video signals representing rightward-rising contours with the luminance [8] and the luminance [4] are inputted to the video signal input terminal 10 of the a circuit having the conventional composition.

In such a case, when processing by the horizontal contour detecting stage 29 and when the pixel at the intersection of the third row and the third column is picked out as the objective pixel X1, the outputs of the contour detecting filters 19a, 19b and 19c become $8\times(-\frac{1}{4})$, $8\times(\frac{2}{4})$ and $4\times(-\frac{1}{4})=-2$, +4 and −1 and the output of the adding circuit 20 becomes +1, whereas when the pixel at the intersection of the third row and the fourth column is picked out as the objective pixel X2, they become $8\times(-\frac{1}{4})$, $4\times(\frac{2}{4})$ and $4\times(-\frac{1}{4})=-2$, +2 and −1 and the output of the adding circuit 20 becomes −1.

The same results will be obtained when the processing is made by using the vertical contour detecting stage 30.

When the pixel at the intersection of the third row and third column is picked out as the objective pixel Y1, they become $8\times(-\frac{1}{4})$, $8\times(\frac{2}{4})$ and $4\times(-\frac{1}{4})=-2$, +4 and −1 and the output of the adding circuit 20 become +1, while when the pixel at the intersection of the third row and the fourth column is picked out as the object pixel Y2, they become $8\times(-\frac{1}{4})$, $4\times(\frac{2}{4})$ and $4\times(-\frac{1}{4})=-2$, +4 and −1 and the output of the adding circuit 20 becomes −1.

These values are added by the adding circuit 31 and are further added to the original video signals by the adding circuit 32 to emphasize the contours as shown in FIG. 3(b).

As shown in FIG. 2(a), when the digital signals representing the horizontal contours and the vertical contours respectively are inputted, at the point where the horizontal contour and the vertical contour intersect each other, both the horizontal contour and vertical contour respectively having the high luminance [8] will not be emphasized as indicated by the circle in FIG. 2(d), thereby maintaining the luminance [8], while the horizontal contour and the vertical contour of the contour respectively having lower luminance [4] will be emphasized to the level of 4−1−1=2 to further emphasize the contour, since both the horizontal contour emphasis and vertical contour emphasis apply in this case. Thus, it has a problem that any one luminance differing in level from a series of uniform luminances will become too conspicuous.

Further, in the case where the digital video signal representing the contour lying at 45° as shown in FIG. 3(a) is inputted, the signal is processed assuming that the points where the horizontal contour and the vertical contour intersect each other occur consecutively, so that, as shown in FIG. 3(b) by circles, the contours having the high luminance [8] are emphasized to a level of 8+1+1= 10 because of the combined effects of the horizontal contour emphasis and vertical contour emphasis, and this also occurs in the cases of the contours having the lower luminance [4], since the luminances of the contours are emphasized to a level of 4−1−1=2 because of the combined effects of emphasis on the horizontal contour and the emphasis on the vertical contour. This has been a problem of the prior art, that is, for instance, the luminance [8] of the inclined contour is overemphasized to [10] while the luminance [4] is to [2] to make the emphasized contours too conspicuous.

An object of the present invention is to provide a contour emphasizing method and circuit designed for being capable of detecting the directions of the contours so that the signals representing the contours at the points where the horizontal contour and the vertical contour intersect and the inclined contours can be processed more naturally than by the conventional method.

DISCLOSURE OF THE INVENTION

The present invention relates to a contour emphasizing method, wherein, with respect to the contours represented by the digital video signals, in order to resolve the problem concerning the point where the horizontal contour and the vertical contour intersect, the luminance of the objective pixel and the luminance of one of the horizontal, vertical, rightward-rising and leftward-rising contours of the pixels adjacent to the objective pixel differing most from the luminance of the objective pixel are weighted respectively to obtain the contour emphasizing values to be added to the value of the objective pixel.

The present invention also relates to a contour emphasizing method, wherein, with respect to the contours represented by the digital video signals, in order to resolve not only the problem concerning the point where the horizontal contour and the vertical contour intersect but also the problem concerning the point of the inclined contour, the luminance of the objective pixel and the luminance of one of the pixels adjacent to the objective pixel in the horizontal, vertical, rightward-rising and leftward-rising directions and differing most from the luminance of the objective pixel are weighted respectively to obtain the contour emphasizing values; a pixel adjacent to the present objective pixel is picked out as a new objective pixel, and this processing is repeated consecutively; when the signs of the two consecutive contour emphasizing values are the same, the contour emphasizing values preceding and following these two consecutive contour emphasizing values are adopted as they are, whereas when the signs of the two consecutive contour emphasizing values differ, the contour emphasizing values preceding and following the two consecutive contour emphasizing values are set to 0 by applying the inclined pixel optimizing processing; the contour emphasizing values, which have undergone the inclined pixel optimizing processing, are respectively added to the corresponding objective pixels.

BEST MODE FOR CARRYING OUT THE INVENTION

The present invention is designed so that only one contour emphasizing value, which is the largest of all the absolute values of the contour emphasizing values of the pixels corresponding to the contours lying in the horizontal, vertical, rightward-rising and leftward-rising directions around a specific pixel, is adopted to thereby prevent the contour emphasizing values for the intersection of the horizontal contour and the vertical contour and the point of inclined contour from being overemphasized and to obtain appropriate contour emphases for those contours which are not emphasized, thereby assuring a natural contour emphasis as a whole. In this way, the present invention is designed so that the contour emphasis at the intersection of the horizontal contour and the vertical contour and the inclined contour point will not be duplicated, or the contour lacking in necessary contour emphasis is emphasized properly for obtaining a more natural contour by processing the corresponding signals properly.

Further, according to the present invention, in order to solve not only the problem of the intersection of the horizontal contour and the vertical contour but also the problem of the diagonal contour, when the signs of the two consecutive weighted contour emphasizing values are equal, two emphasizing values, one preceding and the other following, these contour emphasizing values are adopted as they are, while when the signs of the two consecutive weighted contour emphasizing values differ, the diagonal contour value optimizing processing, designed for setting to 0 the contour emphasizing values, one preceding and the other following the two contour emphasizing values, will be applied, and the optimized contour emphasizing value is added to said objective pixel.

The first embodiment of the present invention will be described referring to FIGS. 4 through 6.

Figure 4:
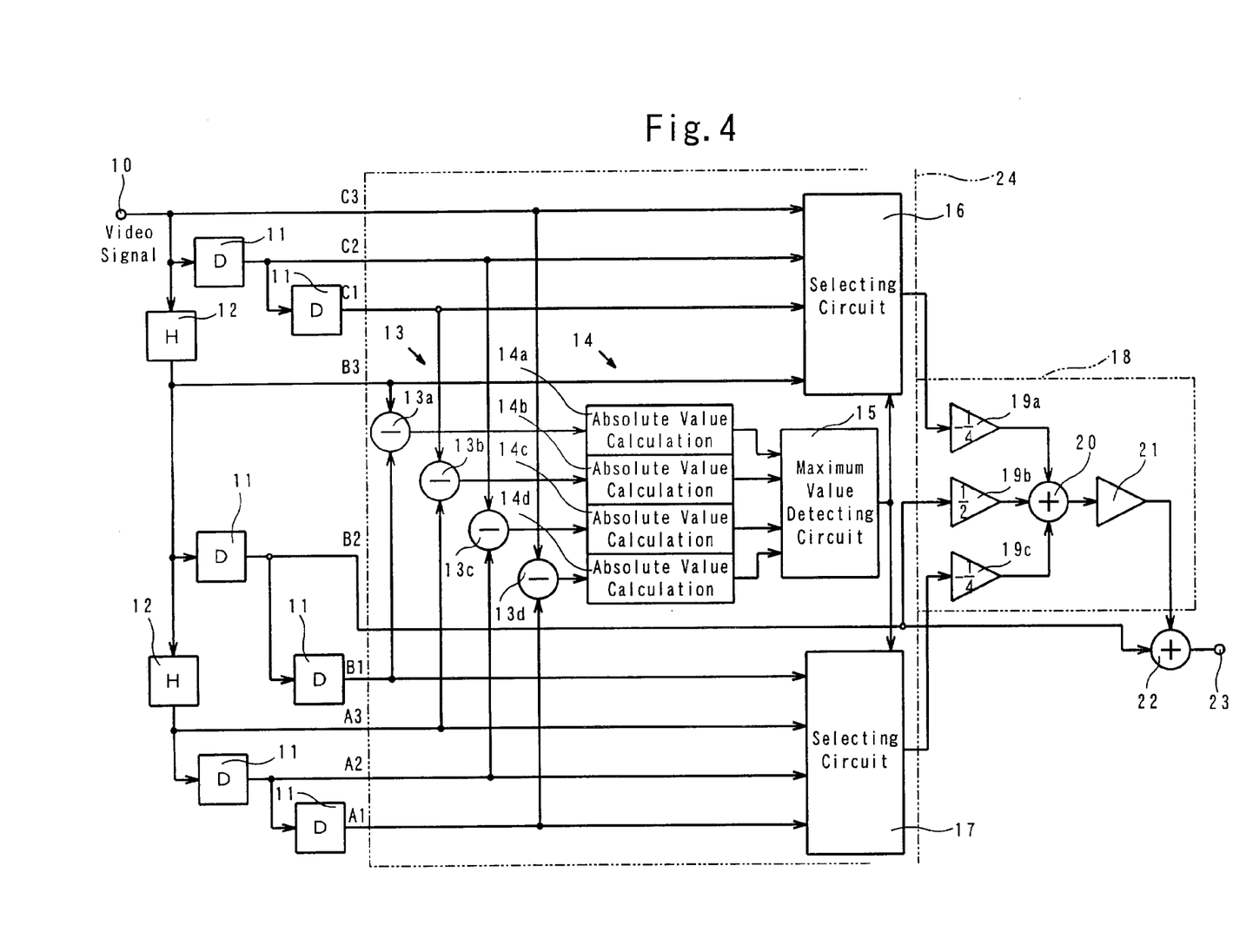
FIG. 4 is a block diagram showing the contour emphasizing circuit as the first embodiment of the present invention.
Figure 5:
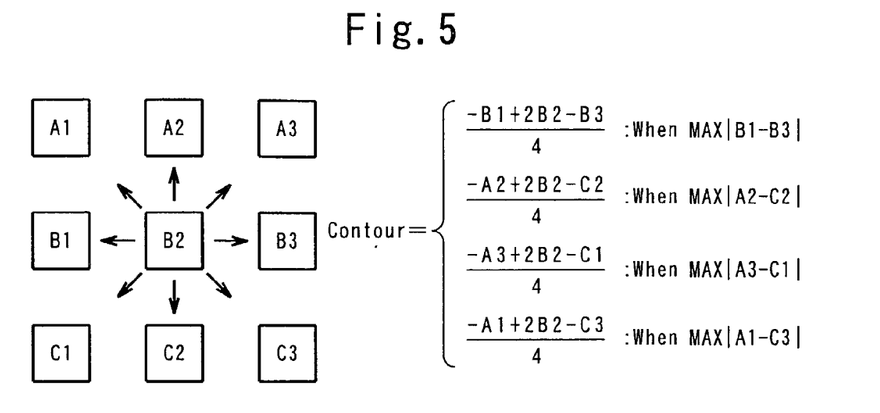
FIG. 5 is an explanatory diagram for explaining the operation taking place in the circuit shown in FIG. 4.

Referring to FIG. 4, in order to synchronize the timings of 9 pixels, namely, horizontal pixels B1 and B3, the vertical pixels A2 and C2, the rightward-rising pixels C1 and A3 and the leftward-rising pixels A1 and C3, which lie around the pixel B2 shown in FIG. 5, six 1-dot delay circuits 11 and two 1-line delay circuits 12 are connected to the video signal input terminal 10.

More particularly, in order to synchronize the timing of the pixel C3 without time delay, which is directly outputted from the video signal input terminal 10, the timing of the pixel C2 is delayed by 1 pixel by means of 1 set of 1-dot delay circuit 11; the timing of the pixel C1 is delayed by 2 pixels by means of 2 sets of 1-dot delay circuit 11; the timing of the pixel B3 is delayed by 1 line by means of 1 set of 1-line delay circuit 12; similarly, the pixel B2 is delayed by 1 line and 1 pixel; B1 is delayed by 1 line and 2 pixels; A3 is delayed by 2 lines; A2 is delayed by 2 lines and 1 pixel; A1 is delayed by 2 lines and 2 pixels.

These A1, A2, A3, B1, B2, B3, C1, C2 and C3 are inputted to the adding circuit 22 by way of the contour direction detecting stage 24 and the contour detecting stage 18 and are then inputted to the video signal output terminal 23.

In the contour direction detecting stage 24, the pixels B1 and B3, representing the horizontal contours respectively and coming before and after the pixel B2, are sequentially inputted to the subtracting circuit 13a for giving the difference between B1 and B2 and to the absolute value calculation circuit 14a; C1 and A3 representing the rightward-rising contours are sequentially inputted to the subtracting circuit 13b for giving the difference of the C1 and A3 and to the absolute value calculation circuit 14b; A2 and C2 representing the contours in vertical direction are sequentially inputted to the subtracting circuit 13C for giving the difference of A2 and C2 and to the absolute value calculation circuit 14C; A1 and C3 representing the leftward-rising contours are sequentially inputted to the subtracting circuit 13d for giving the difference of A1 and C3 and to the absolute value calculation circuit 14d.

These absolute value calculation circuits 14a through 14d are connected to the maximum value detecting circuit 15, while the maximum value detecting circuit 15 outputs the signal for selecting one from among the horizontal pixels B1 and B3, the vertical pixels A2 and C2, the rightward-rising pixels C1 and A3, and the leftward-rising pixels A1 and C3.

The output of said first selecting circuit 16 is inputted to the contour detecting filter 19a of the contour detecting stage 18; the output of said second selecting circuit 17 is inputted to the contour detecting filter 19c; B2 is inputted to the contour detecting filter 19b; further, these contour detecting filters 19a, 19b and 19c are connected to the adding circuit 20 and, simultaneously with the pixel B2, to the adding circuit 22 through the coefficient multiplying circuit 21.

Then, the operation of the present invention will be described further based on the system discussed above.

Figure 6:
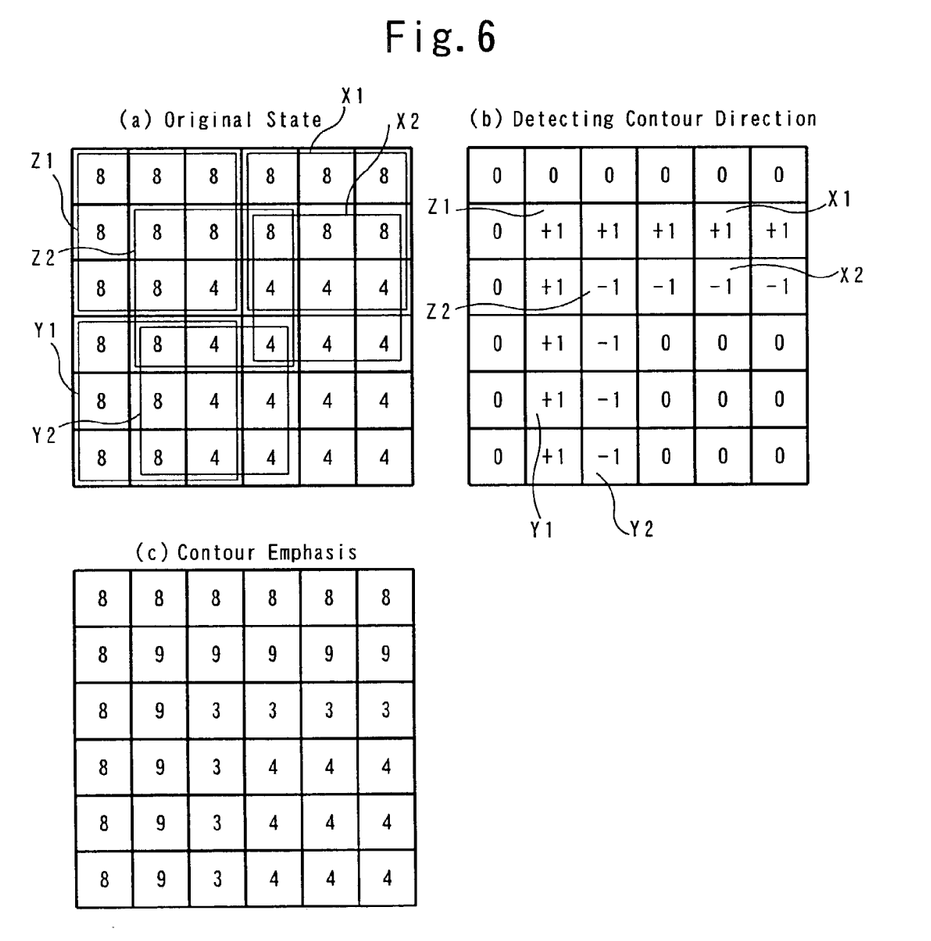
FIG. 6 is a diagram showing the signals at various stages of the contour emphasizing circuit of FIG. 4, wherein (a) is a diagram showing the original states of the digital signals inputted from the video signal input terminal 10; (b), a diagram showing the signals outputted from the contour detecting stage 18; (c), a diagram showing the signals outputted from the video signal output terminal 23.

Here, let's assume that the digital signal inputted to the video signal input terminal 10 represents the horizontal and vertical contours as are shown in FIG. 6(a).

The A1, A2, A3, B1, B2, B3, C1, C2 and C3 are synchronized by means of the 1-dot delay circuit 11 and the 1-line delay circuit 12; the differences between the horizontal pixels B1 and B3, between the vertical pixels A2 and C2, between the rightward-rising pixels C1 and A3, and between the leftward-rising pixels A1 and C3 are detected respectively; the absolute values of these differences are determined; a maximum value is determined from among these absolute values.

Where the coefficients of the contour detecting filters 19a, 19b and 19c are assumed to be $-\frac{1}{4}$, $\frac{2}{4}$ and $-\frac{1}{4}$ respectively, when the absolute value |B1−B3| of the horizontal pixel is a maximum value, (−B1+2B2−B3)/4 will be calculated by the contour detecting stage 18; when the absolute value |A2−C2| of the vertical pixel is a maximum value, (−A2+2B2−C2)/4 will be calculated by the contour detection stage 18; when the absolute value |C1−A3| of the rightward-rising pixel is a maximum value, (−C1+2B2−A3)/4 will be calculated at the contour detection stage 18; when the absolute value |A1−C3| of the leftward-rising pixel is a maximum value, (−A1+2B2−C3)/4 will be calculated by the contour detection stage 18.

For instance, in the case of the 9 pixels within a frame Z1 shown in FIG. 6(a), since the absolute value |A1−C3| of the pixel in the leftward-rising direction is a maximum value, (−A1+2B2−C3)/4 will be calculated, and the B2 in this case becomes +1 as in the case shown in FIG. 6(b).

In the case of the 9 pixels within the frame Z2, since the absolute value |B1−B3| of the horizontal pixel, the absolute value |A2−C2| of the vertical pixel and the absolute value |A1−C3| of the leftward-rising pixel are all maximum values, any one of these maximum values can be selected for calculation, and the value of the B2 in this case becomes −1 as in the case shown in FIG. 6(b).

Similarly, in the case of the 9 pixels within the frame X1, its value becomes +1; in the case of 9 pixels within the frame X2, its value becomes −1; in the case of the 9 pixels within the frame Y1, its value becomes +1; in the case of the 9 pixels within the frame Y2, its value becomes −1; whereby the contour emphasizing values as are given in FIG. 6(b) can be obtained by the contour detecting stage 18.

When the contour emphasizing values obtained by the contour detecting stage 18 are added respectively to the B2 in the adding circuit 22, the video signals modified by the contour emphasizing factors as are shown in FIG. 6(c) will be obtained.

As is obvious from FIG. 6(c), the contours can be emphasized more naturally at the intersection of the horizontal contour and the vertical contour.

Next, the second embodiment of the present invention will be described referring to FIGS. 7 through 9.

In the case of the first embodiment illustrated in FIG. 4, the contours in the horizontal direction and vertical direction can be emphasized without problems, but there is the problem that the diagonal contour rather tends to be overemphasized.

Figure 9:
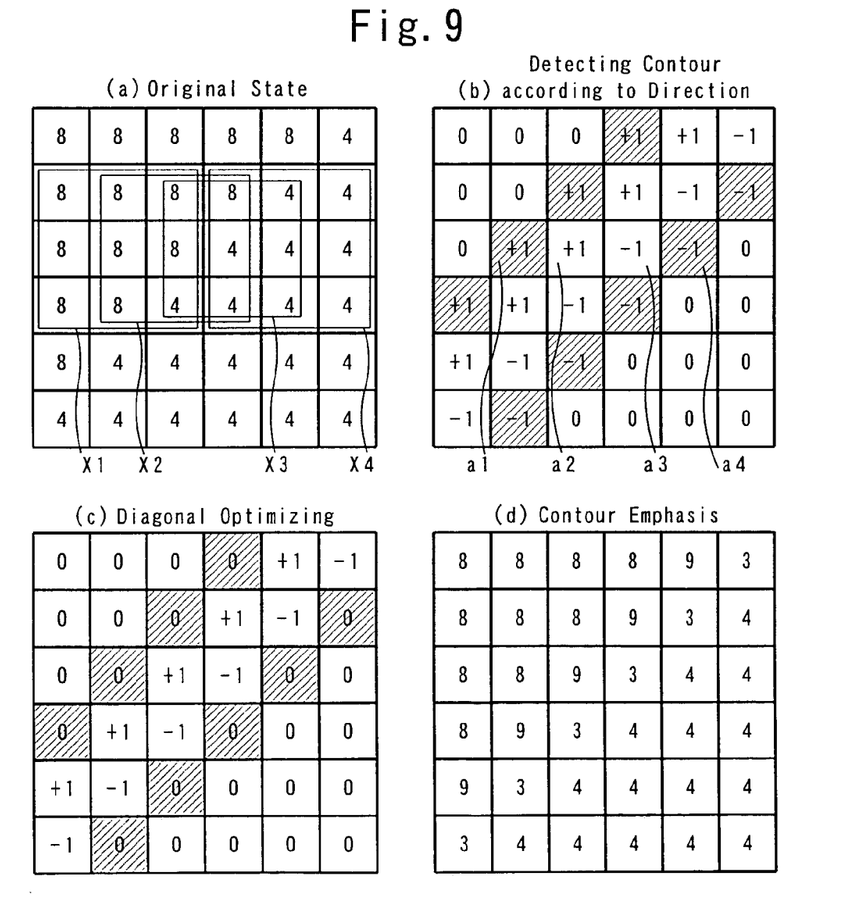
FIG. 9 is a diagram showing the signals at various stages of the contour emphasizing circuit of FIG. 7, wherein (a) is a diagram showing the original states of the digital signals inputted from the video signal input terminal 10; (b), a diagram showing the signals outputted from the adding circuit 20; (c), a diagram showing the signals which have undergone the optimizing processing by the inclined contour optimizing circuit 25; (d), a diagram showing the signal outputted from the image output terminal 23.

For instance, as shown in FIG. 9(a), in the case of the rightward-rising contour as is discussed previously in the first embodiment shown in FIG. 4, in case of the 9 pixels within the frame X1 is +1; in the case of the 9 pixels within the frame X2, it is +1; in the case of the 9 pixels within the frame X3, it is −1; in the case of the 9 pixels within the frame of X4, it is −1. Thus, as indicated by the hatched pixels in FIG. 9(b), there occur 2 consecutive +1 pixels and 2 consecutive −1 pixels, thereby causing the overemphasis on the contours concerned.

Figure 7:
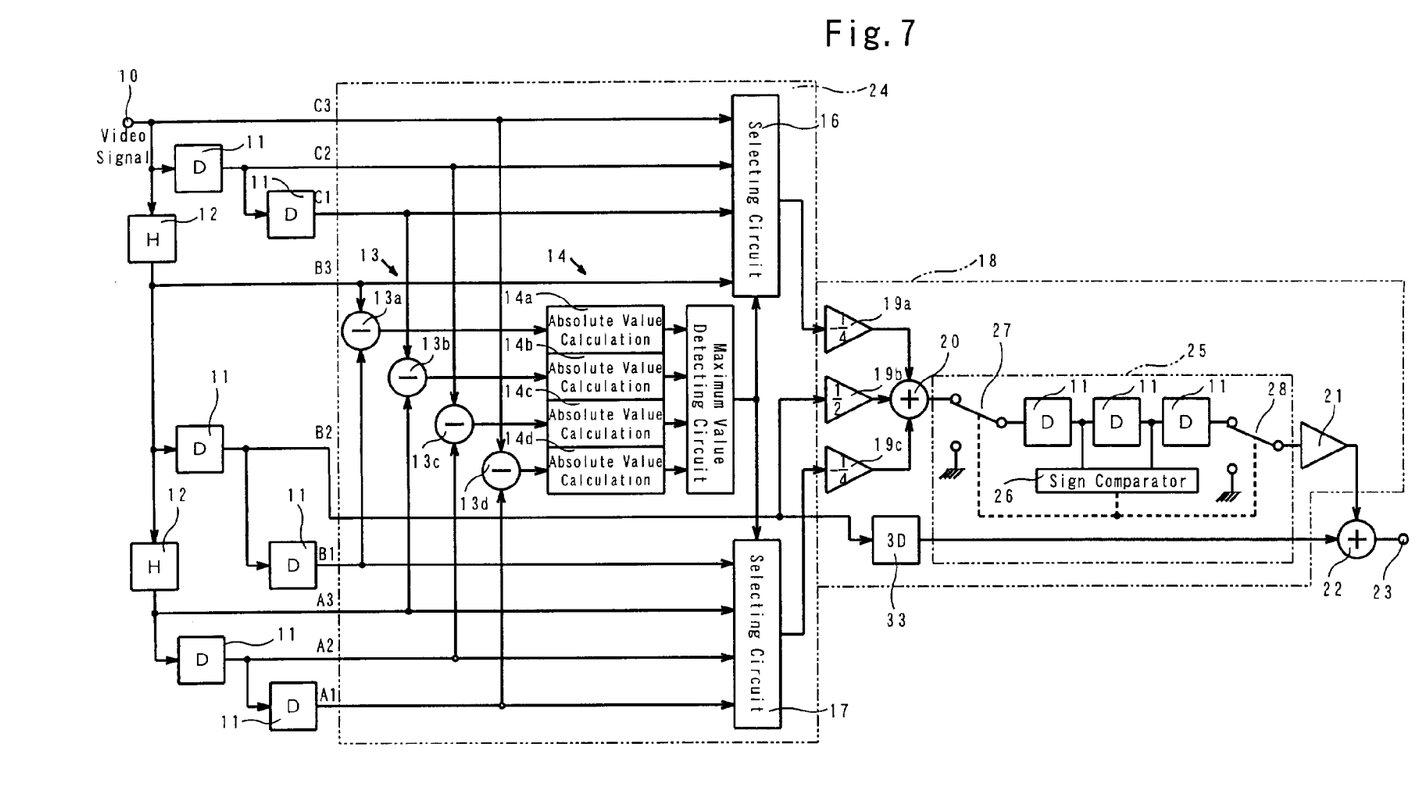
FIG. 7 is a block diagram showing the contour emphasizing circuit as the second embodiment of the present invention.
Figure 8:
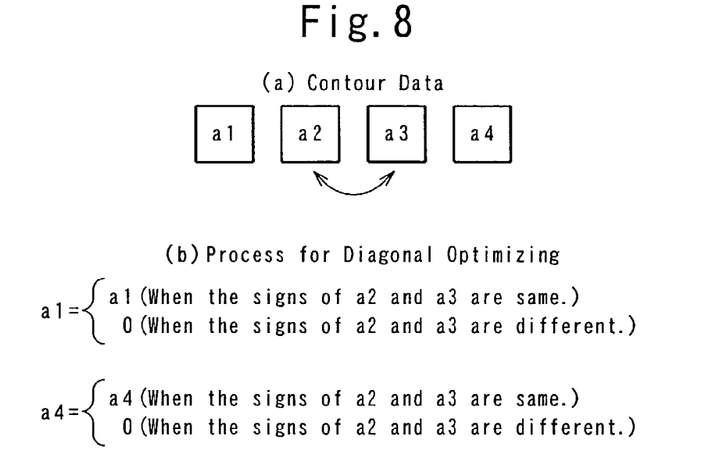
FIG. 8 is an explanatory diagram explaining the operation of the inclined contour optimizing circuit 25 of FIG. 5.

Thus, as shown in FIG. 7, in the second embodiment of the present invention, in order to resolve the problem of the overemphasis as is discussed previously, a diagonal contour optimizing circuit 25 is inserted between the adding circuit 20 and the coefficient multiplying circuit 21 in the contour detecting stage 18.

This diagonal contour optimizing circuit 25 comprises 3 sets of 1-dot delay circuits 11 connected in series, a switching stage 27 inserted between a 1-dot delay circuit 11 and an adding circuit 20, a switching stage 28 inserted between a third 1-dot delay circuit 11 and the coefficient multiplying circuit 21, a sign comparator 26, for comparing the signs, connected to the output side of the first 1-dot delay circuit 11 and to the output side of the second 1-dot delay circuit 11 so that the switching stage 27 and the switching stage 28 can be controlled selectively in response to the output of the sign comparator.

Further, a 3-dot delay circuit 33 is provided in the stage preceding the adding circuit 22 so that the effect of the insertion of the diagonal contour optimizing circuit 25 on the timing of the signal B2 can be adjusted.

The operation of the contour emphasizing circuit composed as described above will be explained in the following.

The output of the adding circuit 20 in the contour detecting stage 18 is similar to that in the case of the first embodiment. For instance, in the case of FIG. 9(b), the contour emphasizing values a1=+1, a2=+1, a3=−1 and a4=−1 can be obtained corresponding to X1, X2, X3 and X4 given in FIG. 9(a).

The sign of the output a2 of the first 1-dot delay circuit 11 and the sign of the output a3 of the second 1-dot delay circuit 11 are compared by means of the sign comparator 26.

In this case, the signs differ, i.e., the sign of a2 being + while the sign of a3 being −, and thus the switching stage 27 and the switching stage 28 are set to 0 respectively. Thus, both a1 and a4 become 0, so that, as shown in FIG. 9(c), the contour emphasizing values a1=0, a2= +1, a3=−1 and a4=0 are obtained. Similarly, since where a1=0, a2=+1, a3=−1 and a4=0, the signs of a2 and a3 are same, a1=0, a2=+1, a3=+1 and a4=−1 are outputted as they are, and also where a1=+1, a2=−1, a3=−1 and a4= 0. Since the signs of a2 and a3 are the same, a1=+1, a2= −1, a3=−1 and a4=0 are outputted as they are.

Therefore, as shown in FIG. 9(d), it can be seen that even inclined contours can be emphasized naturally.

In the cases shown in FIG. 4 and FIG. 7, the coefficients of the contour detecting filters 19a, 19b and 19c of the contour detecting stage 18 are set to −¼, ½, −¼ respectively, but the coefficients are not limited thereto; for instance, the coefficients may be −⅕, ⅖ and −⅕, which make 0 when added.

Further, in the case of the above-mentioned embodiment, 9 pixels (3×3 pixels) are processed at a time, but the number of the pixels to be processed at a time is not limited thereto; for instance, 25 pixels (5×5 pixels) may be processed at a time. For example, when the pixels are grouped as A1–A5, B1–B5, C1–C5, D1–D5 and E1–E5, C3 is the central pixel; for the difference in the luminance in horizontal direction, the difference in luminance between C1 and C5 and the difference in luminance between C2 and C4 are detected. The coefficients can be set, for example, to −1/16, 6/16, −2/16 and −1/16, etc. In this case, all the 25 pixels are not subject to the calculation; 8 pixels A2, A4, B1, B5, D1, D5, E2 and E4 are not subject to detection, that is, the 17 pixels corresponding to the horizontal, vertical, rightward-rising and leftward-rising contours are subject to the calculation.

INDUSTRIAL APPLICABILITY

As discussed in the foregoing, the contour emphasizing method and the circuit according to the present invention is capable of emphasizing naturally the points where horizontal contours and the vertical contours intersect and the inclined contours, which are inputted as the digital video signals, when applied to the PDP or LCD which are driven by the digital video signal.

What is claimed is:

1. A contour emphasizing circuit comprising a synchronizing means, composed of a 1-dot delay circuit and a 1-line delay circuit, for synchronizing the timings of an objective pixel and adjacent pixels in horizontal, vertical, rightward-rising and leftward-rising directions represented by digital video signals, a contour direction detecting stage 24 for detecting the direction of the pixel whose absolute value of the difference in the luminance is largest among the differences in luminance of horizontal, vertical, rightward-rising and leftward-rising pixels which have been synchronized by the synchronizing means, a contour detecting stage 18 composed of an inclined contour luminance optimizing circuit 25 designed so that weighted contour emphasizing values of the luminances of the pixels in the directions detected in the contour direction detecting stage 24 and the luminance of said objective pixel can be determined, so that new objective pixels are picked out consecutively as the pixel next to the present objective pixel, and so that when the signs of two consecutive contour emphasizing values are the same, the contour emphasizing values preceding and following these two consecutive contour emphasizing values are adopted as they are, and when the signs of the two consecutive contour emphasizing values differ, the contour emphasizing values preceding and following these two consecutive contour emphasizing values are set to 0, and an adding circuit 22 for adding the contour emphasizing values, which have undergone inclined pixel optimizing processing in the contour detecting stage 18, to the corresponding objective pixels respectively.

2. The contour emphasizing circuit according to claim 1, wherein the contour detecting stage 18 is composed of contour detecting filters 19a and 19c for weighting the luminances of the pixels in the directions detected in the contour direction detecting stage 24, the contour detecting filter 19b for weighting the luminance of an objective pixel B2, and the inclined contour luminance optimizing circuit 25 designed so that when the signs of two consecutive contour emphasizing values are the same, the contour emphasizing values preceding and following the two consecutive contour emphasizing values are adopted as they are, and when the signs of the two consecutive contour emphasizing values differ, the contour emphasizing values preceding and following said two consecutive contour emphasizing values are set to 0.

3. The contour emphasizing circuit according to claim 1, wherein the synchronizing means is composed of the 1-dot delay circuit 11 and the 1-line delay circuit 12 for synchronizing the timings of 17 pixels, namely, the objective pixel C3 and pairs of adjacent horizontal pixels C1 and C5, C2 and C4, pairs of adjacent vertical pixels A3 and E3, B3 and D3, the pairs of adjacent rightward-rising pixels E1 and A5, D2 and B4, and pairs of adjacent leftward-rising pixels A1 and E5, B2 and D4; the contour direction detecting stage 24 is composed of a subtracting circuit 13 for detecting the difference in the luminance between each of the pairs of the horizontal pixels C1 and C5, C2 and C4, each of the pairs of the vertical pixels A3 and E3, B3 and D3, each of the pairs of the rightward-rising pixels E1 and A5, D2 and B4, each of the pairs of the leftward-rising pixels A1 and E5, B2 and D4, an absolute value calculation circuit 14 for determining the absolute values of the differences in the luminance, a maximum value detecting circuit 15 for detecting the direction of the pixel whose absolute value is largest of all, a first selecting circuit 16 and a second selecting circuit 17 for selecting, for output, one of the directions of the horizontal pixels C1 and C5, C2 and C4, the vertical pixels A3 and E3, B3 and D3, the rightward-rising pixels E1 and A5, D2 and B4, and leftward-rising pixels A1 and E5, B2 and D4 in response to the signal detected in the maximum value detecting circuit 15; the contour detecting stage 18 is composed of contour detecting filters 19a, 19b, 19d and 19e for respectively weighting the luminances of the pixels in the directions detected by said contour direction detecting stage 24, a contour detecting filter 19c for weighting the luminance of said objective pixel C3, and an adding circuit 20 for adding these values; the adding circuit 22 being provided for adding the contour emphasizing value weighted by said contour detecting stage 18 to said objective pixel C3.

4. The contour emphasizing circuit according to claim 3, wherein the coefficients of the contour detecting filters 19a, 19b and 19d for respectively weighting the luminances of the pixels in the directions detected by the contour detecting stage 24 are set to $-1/16$, $-1/8$, $-1/8$, and $-1/16$, while the coefficient of the contour detecting filter 19c for weighting the luminance of the objective pixel C3 is set to $3/8$.

5. A method of emphasizing the contours of pixels represented by a digital video signal, said method comprising the steps of selecting an objective pixel out of the pixels represented by the digital video signal;
   picking out the luminance of the pixel which differs the most from the luminance of the objective pixel from the pixels adjacent to the objective pixel in the horizontal, vertical, rightward-rising and leftward-rising directions;
   utilizing the luminance which differs the most from the luminance of the objective pixel to determine contour emphasizing values;
   selecting a pixel adjacent to the objective pixel as a new objective pixel;
   picking out the luminance of the pixel which differs the most from the luminance of the new objective pixel from the pixels adjacent to the new objective pixel in the horizontal, vertical, rightward-rising and leftward-rising directions;
   utilizing the luminance which differs the most from the luminance of the new objective pixel to determine contour emphasizing values;
   performing inclined contour optimized processing by adopting preceding and following contour values as they are when the signs of two consecutive contour emphasizing values are the same or making the preceding and following contour emphasizing values zero when the signs of the two consecutive contour emphasizing values differ; and
   adding the contour emphasizing values which have undergone the inclined contour optimizing processing to the corresponding objective and new objective pixels respectively.

* * * * *